United States Patent
Brooker et al.

(10) Patent No.: US 11,900,152 B1
(45) Date of Patent: Feb. 13, 2024

(54) CONTROLLED AUTOMATIC UPDATES TO DISK IMAGE LAYERS WITH COMPATIBILITY VERIFICATION

(71) Applicant: Amazon Technologies, Inc., Seattle, WA (US)

(72) Inventors: Marc Brooker, Seattle, WA (US); David Nasi, Seattle, WA (US); Trishika Pattabiraman, Seattle, WA (US); Holly Mesrobian, Seattle, WA (US); Mikhail Danilov, Sammamish, WA (US); Peter Barry, Limerick (IE); Peter Martin McDonnell, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 382 days.

(21) Appl. No.: 17/218,015

(22) Filed: Mar. 30, 2021

(51) Int. Cl.
| | |
|---|---|
| *G06F 3/00* | (2006.01) |
| *G06F 9/48* | (2006.01) |
| *G06F 8/71* | (2018.01) |
| *G06F 11/34* | (2006.01) |
| *G06F 16/18* | (2019.01) |
| *G06F 11/30* | (2006.01) |
| *G06F 8/65* | (2018.01) |

(52) U.S. Cl.
CPC .............. *G06F 9/4843* (2013.01); *G06F 8/65* (2013.01); *G06F 8/71* (2013.01); *G06F 11/3034* (2013.01); *G06F 11/3409* (2013.01); *G06F 16/1873* (2019.01)

(58) Field of Classification Search
CPC ................................ G06F 9/4843; G06F 9/54
See application file for complete search history.

(56) References Cited

U.S. PATENT DOCUMENTS

2002/0059245 A1* 5/2002 Zakharov ............ G06F 16/1734
2007/0083570 A1* 4/2007 Fineberg ............. G06F 16/1873
707/999.203

FOREIGN PATENT DOCUMENTS

| CN | 101669111 A | * | 3/2010 | ............... G06F 8/20 |
| CN | 102394769 A | * | 3/2012 | |
| CN | 106933555 A | * | 7/2017 | ............... G06F 8/22 |

OTHER PUBLICATIONS

Mohd Shahdi Ahmad, Comparison Between Android and iOS Operating System in terms of Security. (Year: 2013).*

* cited by examiner

*Primary Examiner* — Lechi Truong
(74) *Attorney, Agent, or Firm* — Knobbe, Martens, Olson & Bear, LLP

(57) ABSTRACT

Systems and methods are described for providing updating of disk images supporting serverless code execution and controlled deployment of updated disk images. A disk image can be defined as a set of layers that represent a file system include code of a serverless function and other data used by the code. A function owner can designate one layer as containing software or other data subject to update. When a new version of the layer is obtained at a serverless compute system, the system can generate a new disk image containing the updated layer. The system can then gradually transition the function to the new disk image, by dividing calls to the function among two versions of the function—one using the prior disk image, and one using the new disk image. Performance data gained from the new version of the function can be used to control the gradual transition.

20 Claims, 5 Drawing Sheets

CONTROLLED AUTOMATIC UPDATES TO DISK IMAGE LAYERS WITH COMPATIBILITY VERIFICATION

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

Virtual machines are typically defined at least partly based on the data used to run the virtual machine, which is often packaged into a disk image. Generally described, a disk image is data set, such as a file, that contains the contents and structure of a disk volume or data storage device. For example, a disk image may define a file system containing an operating system, libraries, utilities, applications, configurations, and the like. By generating a virtual machine and provisioning it with a disk that matches the contents of the disk image, a user may configure the virtual machine to implement desired functionality. Disk images are also utilized in other virtualization techniques, such as operating-system-level virtualization, a technique in which the kernel of an operating system enables multiple isolated user space instances (often called "containers") without requiring virtualization of the kernel.

One difficulty with use of disk images is the need to maintain images to reflect most recent software updates. Such updates can provide greater or improved functionality, and can often patch security flaws that make disk images running out of date software vulnerable to attack. While "live" file systems may include utilities to keep software up to date, disk images often reflect non-executing software that must typically be updated by external, often manual tools.

DETAILED DESCRIPTION

Figure 1:
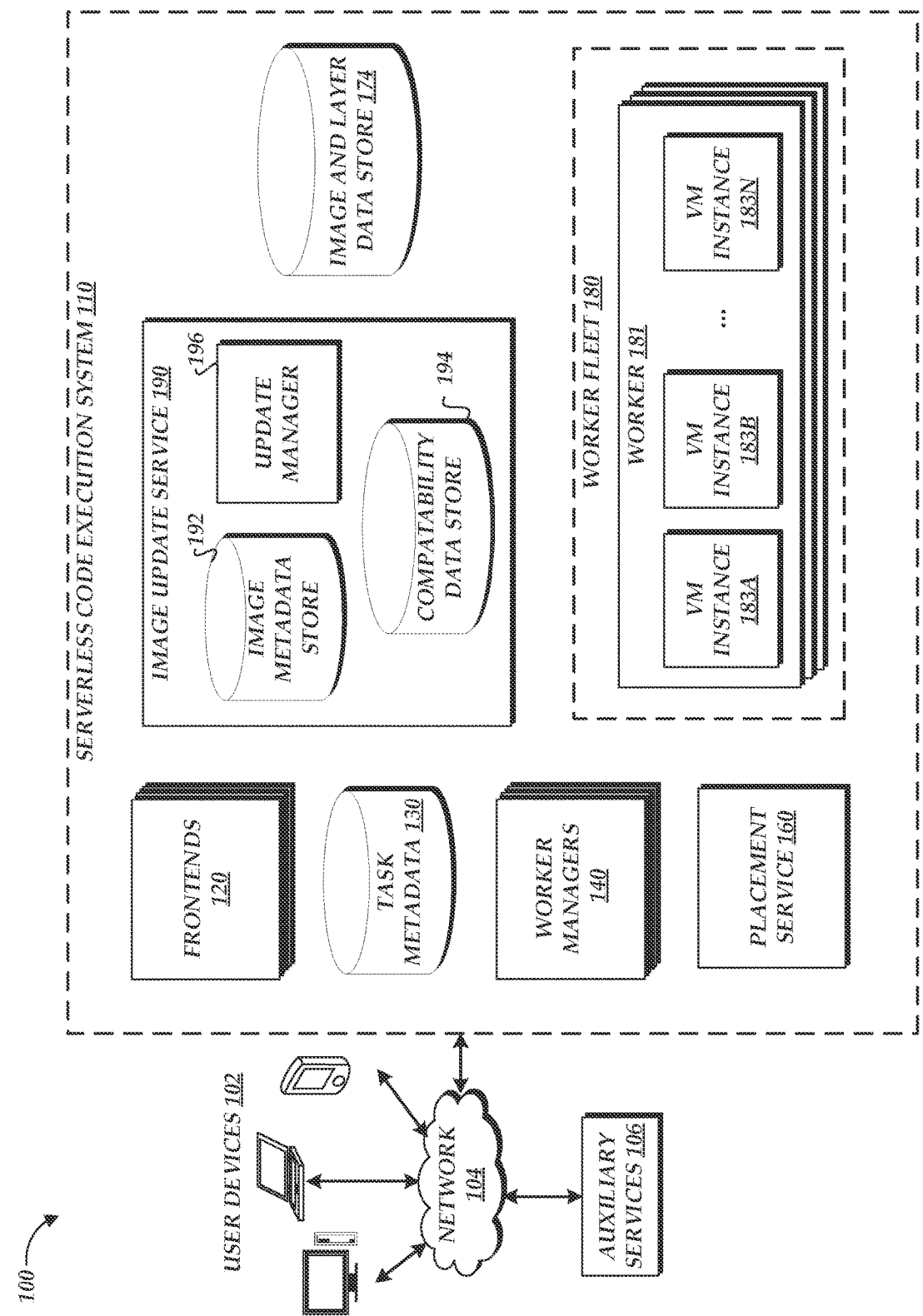
FIG. 1 is a block diagram depicting an illustrative environment in which a serverless code execution system can provide for controlled automatic updates to disk image layers with compatibility verification.

Generally described, aspects of the present disclosure relate to facilitating updates to disk images in a cloud computing environment, such as images containing code to be executed on a serverless code execution system. As described herein, a serverless code execution system enables rapid execution of code, which may be supplied by users of the serverless code execution system in the form of disk images. Each disk image can include a file system defining all software required to execute the code, such as an operating system, libraries, utilities, user-defined code, and the like. A user may submit the disk image to the serverless code execution system, and the serverless code execution system can then enable the user to submit "calls" to execute the code of that disk image, at which point the system will securely execute the code of the disk image to provide the desired functionality. Execution can be halted shortly after providing the desired functionality, such that a user is responsible only for resources used during execution. These execution times are often very short, making serverless computing highly efficient, particularly for tasks with varying demand levels. As is common, a file system may include software written by a number of different parties, any of which may be updated by a respective party to provide increased functionality, patch security flaws, etc. Accordingly, it may be desirable for a disk image to be updated whenever a new version of software included within that image is released. However, the serverless computing model may inhibit any such updating from within software of the disk image itself (e.g., due to lack of ability of an execution to alter an image, due to short execution times, etc.). Moreover, it may be difficult or tedious for an end user to constantly monitor for software updates to a disk image and to re-create the image with updated software. Embodiments of the present disclosure address these problems by providing for a cloud computing system (e.g., a serverless computing system) automatically updates portions of a disk image, as appropriate for the software contained therein. Moreover, embodiments of this disclosure maintain key requirements for many cloud computing systems, including restricting knowledge of the contents of a disk image to an administrator of the cloud computing system. While lack of such knowledge may inhibit updating of software within an image, embodiments of the present disclosure enable such updates to occur even without full knowledge of a disk images contents. Still further, embodiments of the present disclosure provide for automatic compatibility verification, enabling the rollback or inhibition of an update that would otherwise cause errors or lack of functionality within a disk image. Thus, these embodiments provide for a fully automated update system for cloud-hosted disk images.

In one embodiment, the disk images discussed herein are layered. A file system may be defined as a set of layers, with one layer representing a base, and each additional layer representing a changeset relative to the base or a prior layer.

For example, a base layer may represent an operating system, and each additional layer may represent a library, utility, application, etc., installed on the operating system. To provision a virtual machine with the disk image (e.g., provide the virtual machine with the file system defined in the disk image), each layer may be progressively "laid down" on a memory space, such that bits stored in a given location of a subsequent layer can override bits of that location in a prior layer. After all layers are laid down, the file system can be accessed by the virtual machine. One example of a layered disk image is the Open Container Initiative (OCI)'s Image specification. Illustratively, a disk image may be defined at least partly by layer files, each corresponding to respective a layer, and by a manifest file that lists the layer files.

As noted above, one issue that may be of particular concern in cloud computing is that of data privacy: end users may not wish to provide a cloud provider with full access to the data of their disk image, as that data may contain private personal information, confidential business information, passwords, financial data, etc. In one embodiment, use of layered disk images can enable privacy of the majority of a disk image to be maintained, while still enabling automatic updating of some software within the disk image. Often, it may be that the software to be updated in a disk image is not related to private or confidential data within the disk image, and is in fact provided by a third party. For example, a user's disk image may contain both a first layer including user-defined executable code, which may contain private information, and second layer including a runtime environment (e.g., the JAVA™ runtime environment, or "JRE") in which the user executes that code. A user may desire the runtime environment to be periodically updated as a provider of that environment releases new versions of the runtime environment, but not desire to divulge the contents of the first layer to a cloud computing provider. Accordingly, the user may designate a specific layer as subject to updating, and may disclose certain information about that layer (e.g., that it contains a given version of a given runtime). A cloud provider may thus alter that layer of the user's disk image (e.g., by replacing it with a layer containing an updated version of the runtime) without accessing or having knowledge of contents of others layer.

In some embodiments, security of a disk image's contents can be further enhanced by use of digital fingerprints, such as hash values, to represent content of layers. For example, a cloud provide by store fingerprints for each layer of a disk image, which can be computed without knowledge of the contents of the layer (e.g., even if the contents are encrypted). A user may specify a given layer of a disk image as subject to updating, and a cloud provider may update that layer only when the digital fingerprint of the layer matches a known fingerprint, such as the fingerprint of a publicly available layer provided by a software provider. If such a match is detected, the provider can be assured that the layer in the user's disk image is a "stock" layer, without modification, and thus can be updated. If such a match is not detected, it may indicate that the user has modified the layer in some way, and an update should not proceed as doing so may remove or alter a user's data within the disk image, which may also increase the chances of incompatibilities due to the update.

While some incompatibilities may be avoided due to verifying the software to be updated, others may nevertheless occur. For example, user-defined executable code may reference deprecated or obsolete functions of a library or utility, such that updating that library or utility causes the code execution to fail. It may in fact be impossible to verify before-the-fact that updating a given portion of a disk image does not cause such incompatibility or error. In accordance with embodiments of the present disclosure, a cloud computing environment can nevertheless inhibit such errors by providing for a gradual transition to an updated disk image, while monitoring for errors or incompatibilities and controlling the gradual transition based on that monitoring. For example, a serverless compute system may enable a user to define different versions of a "task" executed to implement desired functionality. Each version can be associated with a particular disk image. When a layer of a disk image associated with a task is updated, the serverless compute system can define a new version of the task and associate the new version with the updated disk image. The system may then gradually transition task executions between the two versions, while monitoring for errors or incompatibilities. For example, the serverless compute system may define a percentage split between the two versions, such that only x % of calls to execute the task result in execution of the new version of the task (with the remaining 100-x % resulting in execution of the prior version). The serverless compute system may then verify that executions of the new version do not result in errors, and modify the percentage split accordingly over time to gradually increase the value of x (or, conversely, reduce the value of x when errors occur). Accordingly, if errors do result due to update, only a given percentage of calls to the task will experience such errors, and the update can be rolled back (e.g., by reducing x to zero). If no errors result, the value of x can be increased to 100, resulting in total transition to the new version (and correspondingly the new disk image). In some instances, the serverless compute system can have one or more pre-defined criteria for detecting errors, such as detection of errors by standard operating system error calls. In other instances, a user may submit additional code used to evaluate the output of a task execution for errors, which the serverless compute system may execute against the output to check for errors. Accordingly, potential incompatibilities due to software updates can be controlled and automatically addressed.

In some instances, a cloud computing environment may be configured to use incompatibility information from one disk image to control gradual transition to an updated version of another disk image. For example, two disk images may share a given combination of two pieces of software (with the users of those images electing to disclose this to a cloud computing environment), and a first of the two pieces may be updated. It may be that the update to the first piece of software causes an issue with the second piece of software. In some embodiments, a cloud computing provider may update the first disk image and detect an error during execution of an updated task corresponding to that updated first disk image. The cloud computing environment may detect that the error is likely due to a combination of the updated first piece of software with the second piece of software. Accordingly, the cloud computing environment may rollback the updated task corresponding to the updated first disk image. In addition, the cloud computing environment may prevent or rollback an update to any tasks associated with the second disk image, based on knowledge that the second disk image contains both pieces of software and thus may experience similar errors if the first piece of software were updated.

In some instances, it may be difficult to correlate specific errors with particular combinations of software. For example, it may be difficult to tell whether updating the first piece of software resulted due to inclusion of the second piece of software, or due to other software in the first disk image. To address this, the cloud computing environment may implement various techniques. In one instance, the environment may apply statistical analysis, such as detecting that a threshold percentage of disk images with a particular combination of software experience errors when a given piece within the combination is updated. For example, if 80% of tasks corresponding to disk images containing two pieces of software experience errors when a first of the two pieces is updated, the cloud computing environment may identify the combination as likely to cause errors. In another instance, the environment may utilize knowledge of data reads to identify potential incompatibilities. For example, the environment may have access to the specific locations in a file system read during a task execution (even if the environment does not generally have access to the data stored at those locations). The environment may further maintain a mapping of locations to specific layers. For example, during generation of a file system, the environment may note a range of file system locations (e.g., as block addresses) written to by each layer. The environment may thus determine, for a given execution, the layers potentially read from prior to occurrence of an error. That is, if an execution read from a block address associated with one or more layers, the environment can detect that data of the layer was potentially accessed. If an execution read from a block address associated with only one layer, the environment can detect that data of that one layer was accessed. If an execution did not read from a block address associated with a given layer, the environment can detect that data of that layer was not accessed. The environment can then apply this knowledge to compatibility detection. For example, if an error (or a statistically significant number of errors) occurred in a task execution after update to a first layer and shortly after accessing data of a second layer, the environment may determine that an incompatibility exists between the first and second layers. If such an error occurred but the data of the second layer was never accessed, the environment may be configured not use that error as a data point to detect an incompatibility between the two layers. Other data may additionally or alternatively be used to detect incompatibilities between multiple pieces of software (e.g., multiple layers). For example, the environment may facilitate end user reports of such incompatibilities, which may be applied to other disk images containing the software reported as incompatible due to an update.

While embodiments are described herein with reference to layered disk images, embodiments of the present disclosure may also be applied to non-layered disk images. For example, end users may elect to fully disclose the contents of a disk image to a cloud provider, or may elect to disclose, for example, the locations of particular pieces of software in a disk image to the provider, thus avoiding use of layering. Moreover, while embodiments of the present disclosure are discussed in the context of serverless compute systems, other embodiments may be implemented with respect to other cloud computing systems that execute code included within disk images on behalf of customers. Thus, references to layered disk images or serverless compute systems should be understood to be examples, which examples may be applicable to non-layered disk images and/or other cloud computing systems.

As will be appreciated by one of skill in the art in light of the present disclosure, the embodiments disclosed herein improve the ability of computing systems, such as serverless compute systems, to support automatic updates to disk images, thereby providing increased functionality and security. Moreover, the presently disclosed embodiments address technical problems inherent within computing systems; specifically, the difficulties in providing updates to disk images while limiting knowledge of the data within such images, and the difficulties in detecting and dealing with potential incompatibilities between different software. These technical problems are addressed by the various technical solutions described herein, including a cloud computing service configured to provide updates to layers of disk images in a manner that does not require knowledge of the content of other layers, and configured to provide a controlled, gradual transition between versions of a disk image while monitoring for potential errors or incompatibilities due to updating a disk image. Thus, the present disclosure represents an improvement on serverless code execution systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which client devices 102 may interact with a serverless code execution system 110 via a network 104. By way of illustration, various example client devices 102 are shown in communication with the serverless code execution system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The serverless code execution system 110 may provide the user computing devices 102 with one or more user interfaces, command-line interfaces (CLI), application programming interfaces (API), and/or other programmatic interfaces for generating and uploading user-executable source code (e.g., as part of a disk image), invoking the user-provided source code (e.g., submitting a request to execute the source code on the on-demand code execution system 110), scheduling event-based code executions or timed code executions, tracking the user-provided source code, and/or viewing other logging or monitoring information related to their requests and/or source code. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the serverless code execution environment 110 to implement desired functionality on behalf of a user. Auxiliary services 106 can correspond to network-connected computing devices, such as servers, which generate data accessible to the serverless code execution environment 110 or otherwise communicate to the serverless code execution environment 110. For example, the auxiliary services 106 can include web services (e.g., associated with the user computing devices 102, with the serverless code execution system 110, or with third parties), databases, really simple syndication ("RSS") readers, social networking sites, or any other source of network-accessible service or data source. In some instances, auxiliary services 106 may be invoked by code execution on the serverless code execution system 110, such as by API calls to the auxiliary services 106. In some instances, auxiliary services 106 may be associated with the serverless code execution system 110, e.g., to provide billing or logging services to the serverless code execution system 110. In some instances, auxiliary services 106 actively transmit information, such as API calls or other task-triggering information, to the serverless code execution system 110. In other instances, auxiliary services 106 may be passive, such that data is made available for access by the serverless code execution system 110. For example, components of the serverless code execution system 110 may periodically poll such passive data sources, and trigger execution of code within the serverless code execution system 110 based on the data provided. While depicted in FIG. 1 as distinct from the user computing devices 102 and the serverless code execution system 110, in some embodiments, various auxiliary services 106 may be implemented by either the user computing devices 102 or the serverless code execution system 110.

The client devices 102, auxiliary services 106, and serverless code execution system 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The serverless code execution system 110 is depicted in FIG. 1 as operating in a distributed computing environment including several computer systems that are interconnected using one or more computer networks (not shown in FIG. 1). The serverless code execution system 110 could also operate within a computing environment having a fewer or greater number of devices than are illustrated in FIG. 1. Thus, the depiction of the serverless code execution system 110 in FIG. 1 should be taken as illustrative and not limiting to the present disclosure. For example, the serverless code execution system 110 or various constituents thereof could implement various Web services components, hosted or "cloud" computing environments, and/or peer to peer network configurations to implement at least a portion of the processes described herein.

Further, the serverless code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the serverless code execution system 110 is illustrated as connected to the network 104. In some embodiments, any of the components within the serverless code execution system 110 can communicate with other components of the serverless code execution system 110 via the network 104. In other embodiments, not all components of the serverless code execution system 110 are capable of communicating with other components of the environment 100. In one example, only the frontends 120 may be connected to the network 104, and other components of the serverless code execution system 110 may communicate with other components of the environment 100 via the frontends 120.

In FIG. 1, users, by way of user computing devices 102, may interact with the serverless code execution system 110 to provide source code, and establish rules or logic defining when and how such code should be executed on the serverless code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the serverless code execution system 110, and request that the on serverless code execution system 110 execute the code using one or more execution environments that are managed by the system 110. The serverless code execution system 110 can handle the acquisition and configuration of compute capacity (e.g., containers, instances, etc., which are described in greater detail below) based on the code execution request, and execute the code using the compute capacity. The serverless code execution system 110 may automatically scale up and down based on the volume of request to execute code, thereby relieving the user from the burden of having to worry about over-utilization (e.g., acquiring too little computing resources and suffering performance issues) or under-utilization (e.g., acquiring more computing resources than necessary to run the code, and thus overpaying).

To enable interaction with the serverless code execution system 110, the system 110 includes multiple frontends 120, which enable interaction with the serverless code execution system 110. In an illustrative embodiment, the frontends 120 serve as a "front door" to the other services provided by the serverless code execution system 110, enabling users (via user computing devices 102) to provide, request execution of, and view results of computer executable source code. The frontends 120 include a variety of components to enable interaction between the serverless code execution system 110 and other computing devices. For example, each frontend 120 may include a request interface providing user computing devices 102 with the ability to upload or otherwise communication user-specified code and associated data sets to the on-demand code execution system 110 (e.g., in the form of a disk image) and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the source code specified in the request.

References to source code as used herein may refer to any program code (e.g., a program, routine, subroutine, thread, etc.) written in a specific program language. In the present disclosure, the terms "source code," "user code," and "program code," may be used interchangeably. Source code which has been compiled for execution on a specific device is generally referred to herein as "machine code." Both "source code" and "machine code" are representations of the same instructions, which may be collectively referred to as "code." Such code may be executed to achieve a specific function, for example, in connection with a particular web application or mobile application developed by the user. As noted above, individual collections of code (e.g., to achieve a specific function) are referred to herein as "tasks" or "functions," while specific executions of that code are referred to as "task executions," "function executions," "code executions," or simply "executions." Source code for a task may be written, by way of non-limiting example, in JavaScript (e.g., node.js), Java, Python, and/or Ruby (and/or another programming language). Tasks may be "triggered" for execution on the serverless code execution system 110 in a variety of manners. In one embodiment, a user or other computing device may transmit a request to execute a task may, which can generally be referred to as "call" to execute of the task (e.g., a "task call," a "function call," etc.). Such calls may include an identifier of the task to be executed and one or more arguments to be used for executing the task. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

Prior to calling for execution of a task, an end user may submit (e.g., to a frontend 120) for the task and associated data to be used to execute the task. In one embodiment, the code is provided in the form of a disk image containing the code and other data that the code may use during execution. Illustratively, creation of a task may result in the frontend 12 creating metadata for the task, which defines for example the user creating the task, the disk image used to facilitate execution of the task, trigger conditions for the task, and the like. In one embodiment, tasks may be versioned, with task metadata identifying the available versions and at least some other metadata for a task may vary across versions. For example, different versions may be associated with different disk images. Metadata is illustratively stored in the task metadata store 130.

One submitting a disk image, the image is illustratively stored (e.g., by the frontend 120) in the image and layer data store 174. In one embodiment, each image is stored as a set of layers and a manifest identifying the layers making up the disk image. Separate storage of layers and a manifest may enable, for example, deduplication of layers. For example, where two images share a layer, the image and layer data store 174 may store only a single copy of that layer. Deduplication may be conducted, for example, based on a digital fingerprint of a layer. Illustratively, each layer may be identified in the store 174 based on a digital fingerprint, such as a hash value, message authentication code (MAC) or the like, which fingerprint is calculable based on the contents of the layer. Accordingly, when two layers share a fingerprint, the system 110 may conclude that the two layers are identical and thus store only a single copy of that layer. As noted above, layers may associated with software that is versioned, such that a first layer corresponds to a first version of software and a second layer corresponds to a second version of software. For ease of reference, the present disclosure refers to such layers as themselves being versioned. However, while the system 110 may in some cases maintain versioning information for layers directly, it may additionally or alternatively maintain versioning information for software, along with information mapping such software versions to particular layers (e.g., a first layer corresponds to version 1 of a particular software, a second layer corresponds to version 2, etc.). In some cases, each disk image is additionally or alternatively stored as an unlayered image, such as one or more files providing a block-level representation of a file system. For example, the system 110 may "flatten" a layered disk image by using the layers to create a file system, and then saving a non-layered representation of that file system to the image and layer data store 174. In some cases, the non-layered representation may be divided into a number of distinct chunks, which may be deduplicated within the data store 174. Generation and handling of file system chunks is discussed in more detail in U.S. patent application Ser. No. 17/105,250, filed Nov. 25, 2020 and entitled "LOW LATENCY ACCESS TO DATA SETS USING SHARED DATA SET PORTIONS" (the "'250 Application") the entirety of which is hereby incorporated by reference.

Both the task metadata store 130 and the image and layer data store 174 can correspond to any persistent data store. In one embodiment, the task metadata store 130 and the image and layer data store 174 are implemented as logical storage on a cloud storage service, such as an object storage system. An example of such an object storage system is AMAZON™'s SIMPLE STORAGE SERVICE™ (or "S3™").

After a user has created a task on the serverless code execution system 110, the system 110 may accept calls to execute that task. To calls to execute a task, the frontend 120 can include an execution queue, which can maintain a record of requested task executions. Illustratively, the number of simultaneous task executions by the serverless code execution system 110 is limited, and as such, new task executions initiated at the serverless code execution system 110 (e.g., via an API call, via a call from an executed or executing task, etc.) may be placed on the execution queue and processed, e.g., in a first-in-first-out order. In some embodiments, the on-demand code execution system 110 may include multiple execution queues, such as individual execution queues for each user account. For example, users of the serverless code execution system 110 may desire to limit the rate of task executions on the serverless code execution system 110 (e.g., for cost reasons). Thus, the serverless code execution system 110 may utilize an account-specific execution queue to throttle the rate of simultaneous task executions by a specific user account. In some instances, the serverless code execution system 110 may prioritize task executions, such that task executions of specific accounts or of specified priorities bypass or are prioritized within the execution queue. In other instances, the serverless code execution system 110 may execute tasks immediately or substantially immediately after receiving a call for that task, and thus, the execution queue may be omitted.

As noted above, tasks may be triggered for execution at the serverless code execution system 110 based on explicit calls from user computing devices 102 (e.g., as received at a request interface). Alternatively or additionally, tasks may be triggered for execution at the serverless code execution system 110 based on data retrieved from one or more auxiliary services 106. To facilitate interaction with auxiliary services 106, the frontend 120 can include a polling interface, which operates to poll auxiliary services 106 for data. Illustratively, the polling interface may periodically transmit a request to one or more user-specified auxiliary services 106 to retrieve any newly available data (e.g., social network "posts," news articles, files, records, etc.), and to determine whether that data corresponds to user-established criteria triggering execution a task on the serverless code execution system 110. Illustratively, criteria for execution of a task may include, but is not limited to, whether new data is available at the auxiliary services 106, the type or content of the data, or timing information corresponding to the data. In some instances, the auxiliary services 106 may function to notify the frontend 120 of the availability of new data, and thus the polling service may be unnecessary with respect to such services.

In addition to tasks executed based on explicit user calls and data from auxiliary services 106, the serverless code execution system 110 may in some instances operate to trigger execution of tasks independently. For example, the serverless code execution system 110 may operate (based on instructions from a user) to trigger execution of a task at each of a number of specified time intervals (e.g., every 10 minutes).

The frontend 120 can further includes an output interface configured to output information regarding the execution of tasks on the serverless code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

Code executions triggered on the serverless code execution system 110 of FIG. 1 are executed by execution environments hosted by a set of workers 181 within a worker fleet 180. Each worker 181 is illustratively a host device configured to host multiple execution environments, which in FIG. 1 are virtual machine instances 183A-N. Execution environments may alternatively include software containers, sometimes referred to as "OS-level virtualization," another virtualization technology known in the art. Thus, where references are made herein to VM instances 183, it should be understood that (unless indication is made to the contrary) a container may be substituted for such instances 183.

As shown in FIG. 1, each worker 181 may host a number of instances 183. Each instance 183 may be isolated from other instances 183, thus ensuring the security of code executions on the serverless code execution system 110. For example, each instance 183 may be divided by a virtualization boundary, by virtue of the instance 183 being a virtual machine hosted by the worker 181. In addition, each instance 183 may exist within a partitioned user space on the worker 181, which logically partitions resources of the worker 181 among instances 183. Each user space may, for example, represent a "chroot" jail—a known isolation technique for LINUX™ operating systems.

To facilitate rapid execution of code, each worker 181 may be configured to maintain a set of instances 183 in a "pre-warmed" state, being at least partially configured to begin execution of code. For example, instances may be created on the worker and configured with access to computing resources (CPU, RAM, drive storage, etc.). In some cases, it may be impractical or impossible to maintain instances 183 in a fully warmed state for all possible code executions, as executions may be associated with a wide variety of at least partially distinct data sets (e.g., disk images and/or snapshots). Thus, instances 183 may be maintained in a "greatest commonality" for a given group of tasks, such as being provisioned with a set of computing resources common to those tasks, being configured to accept an operating system type used by those tasks, etc.

On receiving instructions to provision an instance 183 to support execution of the task, the worker 181 may adjust the configuration of the instance 183 to support that execution. Specifically, the worker 181 may provision the instance 183 with access to a disk image or snapshot corresponding to the task. In some instances, the worker 181 may retrieve the disk image from the image and layer data store 174 and store the full image locally. In other instances, the worker 181 may provide to an instance 183 what appears to be full local access to the disk image or snapshot, while "lazily" retrieving portions of that image or snapshot in response to a request to read such portions. Techniques for providing lazy retrieval of image portions are discussed in the '250 Application, incorporated by reference above.

In addition, the system 110 includes a number of components for facilitating distribution of calls to execute a task from frontends 120 to particular VM instances 183. For example, the serverless code execution system 110 includes one or more worker managers 140 configured to manage execution environments (e.g., virtual machine instances) hosted by workers 181 among a worker fleet 180. The worker managers 140—each of which are illustratively implemented as physical or virtual-on-physical devices—illustratively "lease" particular VM instances 183 within the fleet 180, thus gaining operational control to, for example, instruct virtual machine instances 183 to execute code of the task. Thus, on receiving a call to execute a task, a frontend 120 may distribute the call to a worker manager 140, which may identify a currently-leased VM instance 183 in which to implement the task, and cause the instance 183 to implement the task. Example interactions for distributing a call from a frontend 120 to a worker manager 140 are described, for example, in U.S. Pat. No. 10,942,795 to Yanacek et al, entitled "SERVERLESS CALL DISTRIBUTION TO UTILIZE RESERVED CAPACITY WITHOUT INHIBITING SCALING" (the "'795 Patent"), the entirety of which is hereby incorporated by reference.

In the instance that a worker manager 140 does not currently lease a VM instance 183 corresponding to the called task, the worker manager 140 can contact a placement service 160 to request a lease on an additional instance 183, which is illustratively configured to grant to the worker managers 140 leases to individual VM instances 183. Illustratively, the placement service 160 may maintain state information for VM instances 183 across the fleet 180, as well as information indicating which manager 140 has leased a given instance 183. When a worker manager 140 requests a lease on an additional instance 183, the placement service 160 can identify an appropriate instance 183 (e.g., warmed with software and/or data required to support a call to implement a task) and grant to the manager 140 a lease to that instance 183. In the case that such an instance 183 does not exist, the placement service 160 can instruct a worker 181 to create such an instance 183 (e.g., by creating an instance 183 or identifying an existing unused instance 183, storing an appropriate data manifest 186 for a required disk image, snapshot, etc. in a user space 182 of that instance 183, and configuring the file system process 184 to provide access to the required data set) thereafter grant to the worker manager 140 a lease to that instance 183, thus facilitating execution.

In accordance with embodiments of the present disclosure, the serverless code execution system 110 further includes an image update service 190 configured to provide for automatic updating of disk images used to facilitate task execution, including gradual transitioning of task executions to the updated disk image and automatic compatibility checking. Specifically, the update service 190 includes an image metadata store 192, a compatibility data store 194, and an update manager 196.

The image metadata store 192 illustratively includes information as individual disk images (e.g., as stored in the image and layer data store 174) that contain layers subject to updating. For example, on creation of a task, a user may designate one or more layers of a disk image used by the task as subject to updating. In one embodiment, to ensure privacy of disk image data, the image metadata store 192 stores only information regarding designated layers, and does not store information regarding undesignated layers. For example, the metadata store 192 may indicate that layer x of disk image y is subject to update. In some instances, the service 190 may require a user to specify the software contained within the layer, which specification may be stored within the image metadata 192. Further, the service 190 may in some cases verify designations based on digital fingerprints of a layer, such as by storing a layer as subject to updating only when a fingerprint of the layer matches a fingerprint of a layer known to contain the specified software. The layer known to contain the specified may be provided, for example, by an author of the specified software, and stored within the image and layer data store 174.

The update manager 196 illustratively represents a computing device configured to manage automatic updates to disk images on the system 110. As described in more detail below, the manager 196 may detect the availability of a new version of a layer, detect disk images containing an older version of the layer, and initiate a gradual transition of tasks corresponding to such disk images to new disk images containing the new layer version. The manager 196 can further monitor errors or performance data from tasks executing with the new disk images, to detect potential incompatibilities of the new layer version with those tasks. The manager 196 can adapt the gradual transition based on the monitored errors or performance data, such that the transition halts or is rolled back if errors or incompatibilities are detected. As noted above, in some cases data from one task may be used to control gradual transition of another task, such as when both tasks share software determined by the update manager 196 to be incompatible with a layer update. Data regarding compatibility issues is illustratively stored in the compatibility data store 194. Both the compatibility data store 194 and image metadata store 192 can correspond to any substantially persistent storage, such as a cloud based object storage system.

Figure 2:
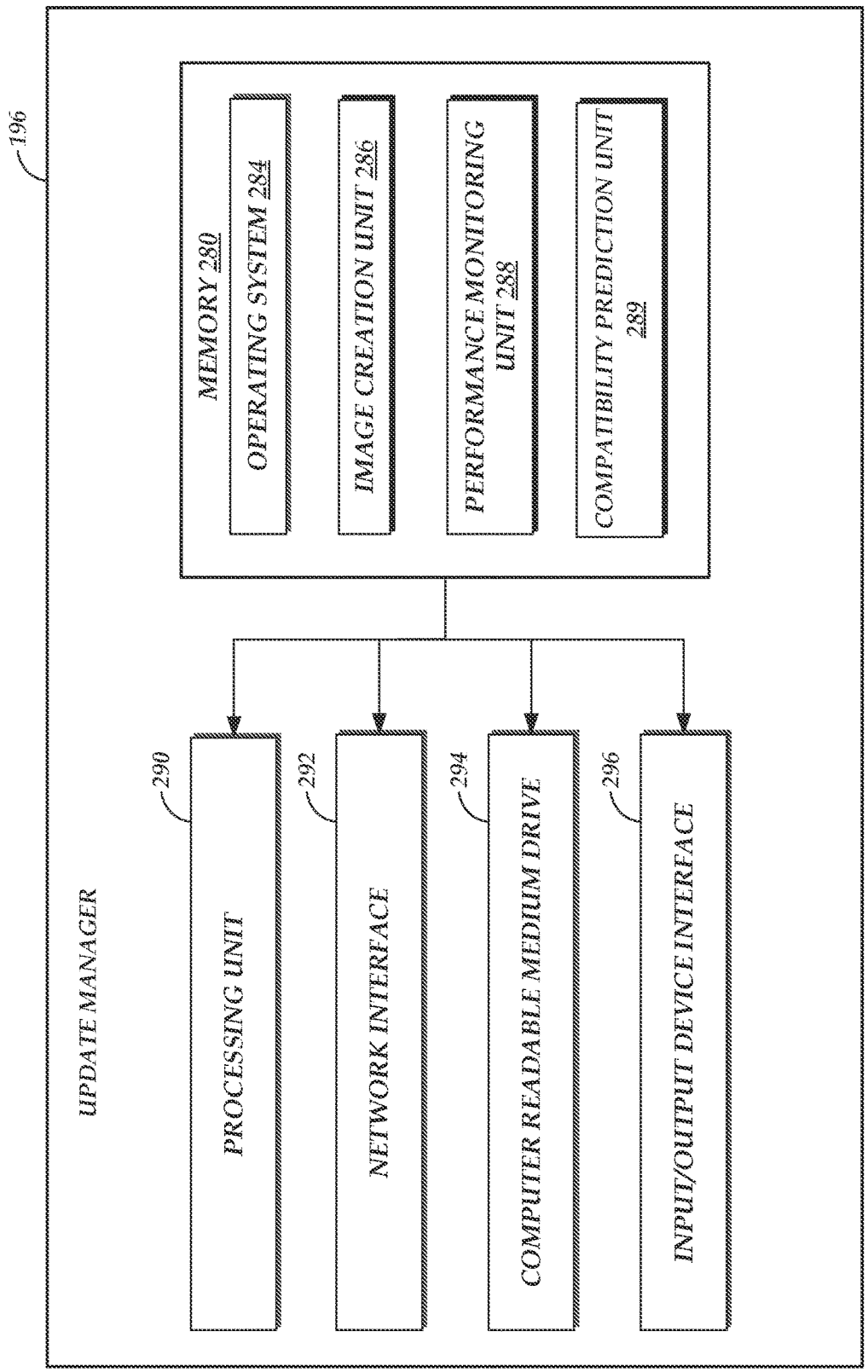
FIG. 2 depicts a general architecture of a computing device providing an update manager of FIG. 1, which can provide for controlled automatic updates to disk image layers with compatibility verification.

FIG. 2 depicts a general architecture of a computing system implementing the update manager 196 of FIG. 1. The general architecture of the system depicted in FIG. 2 includes an arrangement of computer hardware and software that may be used to implement aspects of the present disclosure. The hardware may be implemented on physical electronic devices, as discussed in greater detail below. The system may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 2 (e.g., a worker 181, a frontend 120, etc.).

As illustrated, the system includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as units in some embodiments) that the processing unit 290 executes in order to implement one or more aspects of the present disclosure, along with data used to facilitate or support such execution. While shown in FIG. 2 as a single set of memory 280, memory 280 may in practice be divided into tiers, such as primary memory and secondary memory, which tiers may include (but are not limited to) random access memory (RAM), 3D XPOINT memory, flash memory, magnetic storage, and the like. For example, primary memory may be assumed for the purposes of description to represent a main working memory of the system, with a higher speed but lower total capacity than a secondary memory, tertiary memory, etc.

The memory 280 may store an operating system 284 that provides computer program instructions for use by the processing unit 290 in the general administration and operation of the device 200. The memory 280 may further include computer program instructions and other information for implementing aspects of the present disclosure. For example, in one embodiment, the memory 280 includes an image creation unit 286 representing code executable to generate flattened disk images from a layered disk image, for use by task executions. In addition, the memory 280 includes a performance monitoring unit 288 representing code executable to monitor performance of tasks executing based on updated disk images and control gradual transition of tasks to (or away from) an updated disk image based on the monitored performance. The memory 280 further includes a compatibility prediction unit 289, representing code executable to detect incompatibilities between software of disk images, enabling performance information gained from a disk image corresponding to a first task to be used in controlling gradual transition of a second task to an updated disk image. In combination, the elements of the memory 280, when executed on the device 200, enable implementation of embodiments of the present disclosure.

The system of FIG. 2 is one illustrative configuration of such a device, of which others are possible. For example, while shown as a single device, a system may in some embodiments be implemented as a logical device hosted by multiple physical host devices. In other embodiments, the system may be implemented as one or more virtual devices executing on a physical computing device. While described in FIG. 2 as a update manager 196, similar components may be utilized in some embodiments to implement other devices shown in the environment 100 of FIG. 2.

Figure 3:
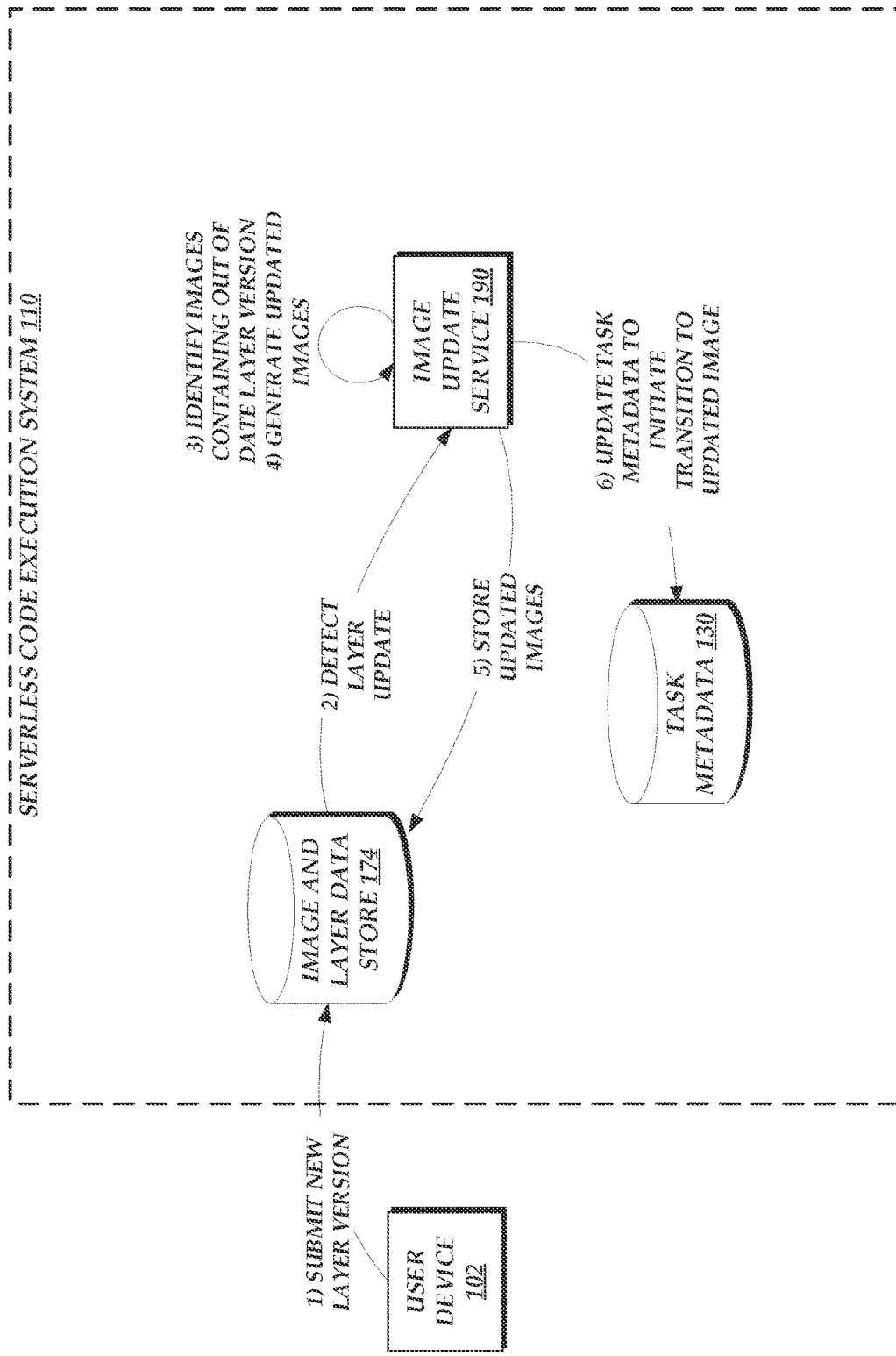
FIG. 3 is a flow diagram depicting illustrative interactions for updating disk images in response to an updated image layer, and for initiating a gradual transition of task executions to using the update disk images.

With reference to FIG. 3, illustrative interactions are depicted for updating disk images in response to an updated image layer, and for initiating a gradual transition of task executions to using the update disk images, will be described. The interactions of FIG. 3 assume that a user has previously interacted with the serverless code execution system 110 to create a task whose execution is supported by a disk image, and that the user has identified the disk image as including a layer subject to update as containing a particular software (e.g., a library, utility, runtime, etc.). For example, the user may provide the disk image in the form of a manifest and set of layers, and the user may specify a particular layer as containing a particular software subject to update.

The interactions of FIG. 3 begin at (1), where a user device 102 submits to the image and layer data store 174 a new version of the particular layer (e.g., a layer containing a new version of software included in the particular layer). The user device 102 may be operated, for example, by an author of the software included within the layer. Illustratively, if the layer corresponds to the JRE, the user device 102 may submit a new layer corresponding to a new version of the JRE.

At (2), the image update service 190 detects the update to the layer based on the data within the image and layer data store 174. For example, the service 190 may detect that a new layer has been provided, and that a version number associated with the layer is higher than a previously highest known version number.

At (3), the image update service 190 identifies images containing the now out of data layer version. Illustratively, the image update service 190 may inspect manifests for a set of disk images including the now out of date layer version. For example, where the now out of date layer version is identified by a digital fingerprint (e.g., hash or MAC), the service 190 may identify manifests that reference that digital fingerprint.

At (4), the image update service 190 generates update disk images containing the new layer version. For example, the service 190 can generate a new manifest that replaces a reference to the prior layer version with a reference to the new layer version. In one embodiment, the service 190 "flattens" the new disk image to create a flattened image used to support code execution, which flattened image may be used as the updated disk image. In some embodiments, the image update service, during generation of an updated disk image, may generate information correlated block locations in the disk image to particular layers. For example, during flattening of layers into a flattened image, the service 190 may record particular ranges of blocks written within a file system. As discussed herein, this information may later be used in determining compatibility of different layers, such as by determining that an incompatibility is likely to exist with a particular software when an error occurs during or shortly after reading data of a layer corresponding to that software, or determining that an incompatibility is unlikely to exist with a particular software when an error occurs without reading data of a layer corresponding to that software.

At (5), the service 190 stores the updated disk images to the image and layer data store 174. For example, the service 190 may store an updated manifest replacing a reference to a now out of date layer with a reference to the updated layer. The service 190 may additionally or alternatively store an updated flattened disk image. In addition, at (6), the service 190 updates metadata for the task within the task metadata store 130 to initiate a gradual transition of the task to use of the updated disk image. Illustratively, the service 190 may alter the metadata 130 to create new version of the task associated with the updated disk image (while also maintaining a prior version of the task associated with the non-updated disk image). The service 190 can further alter the metadata 130 such that a proportion of new calls to execute the task result in execution of the new version of the task. Illustratively, a frontend 120 may be configured to respond to a call to execute a task by reading the metadata and executing one of the prior task version or the new task version according to the proportion (e.g., with an x % chance for any given call to execute the new task version and an 100-x % chance for that call to execute the prior task version).

The proportion may initially be set to a relatively low value (e.g., 5%, 10%, etc.), such that any incompatibilities or errors due to the updated disk image are minimized. As discussed herein, the proportion may be altered over time to control gradual transition of the task to the new version, according to performance monitoring of task executions. For example, errors during execution of the task may result in the proportion being decreased (potentially to zero), while a lack of errors (or potentially the detection of errors during task executions of the prior version) may result in the proportion being increased, eventually to 100%, at which point the gradual transition is completed.

Figure 4:
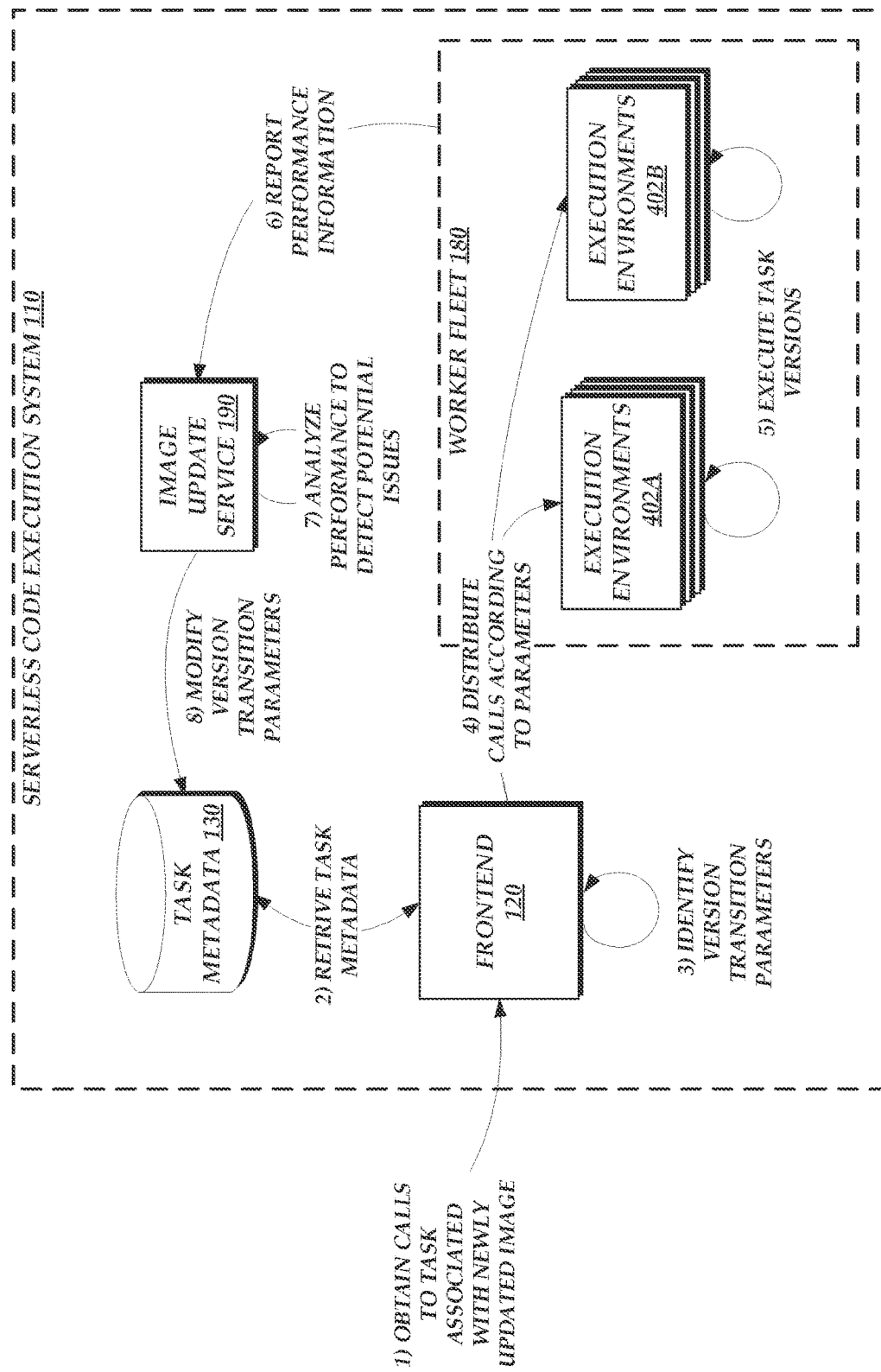
FIG. 4 is a flow diagram depicting illustrative interactions for managing a gradual transition of a task between disk image versions.

Illustrative interactions for managing a gradual transition of a task between disk image versions are shown in FIG. 4. Specifically, at (1), the frontend 120 obtains a set of calls to a task that is associated with a newly updated disk image (e.g., a task with metadata modified via the interactions of FIG. 3). The calls may be obtained from user devices 102, auxiliary services 106, generated at the serverless code execution system 110 based on pre-defined trigger conditions, etc., as described above.

At (2), the frontend 120 retrieves metadata for the task. The metadata illustratively identifies at least two versions of the task, and a proportion of calls to route to each version. It is assumed for purposes of discussion of FIG. 4 that each of the at least two versions corresponds to a different version of a disk image, one corresponding to an older version of a layer of software and another corresponding to a newer version. The obtained metadata may include other information, such as required authentication information for the calls, which the frontend 120 may use in validating the calls.

At (3), the frontend 120 identifies version transition parameters from the metadata, such as a proportion of calls to route to each version of a task. Thereafter, at (4), the frontend 120 distributes the calls to execution environments 402A and 402B on the worker fleet 180. Each execution environment 402 illustratively corresponds to an environment provisioned with access to a disk image (e.g., access to a file system as defined according to the disk image) corresponding to a respective version of the task. For example, execution environments 402A illustratively correspond to environments provisioned with a file system as defined by a disk image with a prior version of a software layer, while execution environments 402B illustratively correspond to environments provisioned with a file system as defined by a disk image with a current or newer version of a software layer, as included within the disk image by operation of the image update service 190. While distribution in FIG. 4 is shown as between the frontend 120 and the execution environments, distribution may in some cases involve other elements of the serverless code execution system 110, such as worker managers 181 and the placement service 160. For example, the frontend 120 may interact with a worker manager 181 prior to distributing a call to identify the environments 402A-B to which to distribute the calls, and the worker manager 181 may interact with the placement service to generate the environments 402A-B and "lease" the environments to the manager 181. Examples of such interactions are discussed in the '795 Patent, incorporated by reference above.

As noted above, each of the environments 402A-B is illustratively provisioned with a different disk image version. In one embodiment, these versions differ only in a single layer that has been modified by the image update service 190, e.g., via the interactions of FIG. 3. Accordingly, each environment 402 in FIG. 4 response to the distributed calls by executing user-defined code within the respective disk images. To the extent that the user-defined code exist within a non-modified layer, the code executing in both environments may be identical. However, that code may in turn call, invoke, rely on, or otherwise reference data or code within a modified layer, where differences exist between the images of the respective environments 402. Accordingly, it is possible that the modification to that layer by the image update service 190 results in errors or performance issues in execution environments 402B (the environments 402 provisioned with the updated disk image). For example, user-defined code may refer to deprecated or outdated function calls, for which support has been removed in a layer version included in an updated disk image. Thus, calls to such functions may cause task execution in environments 402B to fail, while the same user-defined code executing in environments 402A may succeed. In some cases, the opposite may be true: updating a layer of a disk image may result in increased performance or reduction of errors, due for example to improved code within the layer. Accordingly, performance of task executions in environments 402B may exceed performance of task executions in environments 402A.

In either instance, performance information from both environments 402 is submitted to the image update service 190 at (6). In one embodiment, the environments 402 themselves may report performance information. In another embodiment, workers 180 hosting the respective environments 402 may report the information. The performance information can include, for example, a record of errors, warnings, or the like reported by the task execution or the environments 402 (e.g., via operating system or other standard error calls) and performance metrics of the execution (e.g., execution time, usage of various computing resources, such as central processing unit (CPU) usage, random access memory (RAM) usage, network bandwidth usage, thread counts, etc.).

At (7), the image update service 190, the image update service 190 analyzes the performance data to detect potential issues. For example, if performance metrics (e.g., as measured in terms of computing resource usage, execution time, etc.) of a task executed based on an updated disk image drop by a threshold amount (e.g., an absolute amount or a percentage) relative to metrics of the task executed based on a non-updated disk image, the service 190 may identify a potential issue with respect to the updated disk image. Similarly, the service 190 may identify a potential issue if a number or severity of errors reported by a task execution based on the updated disk image increase relative to the number or severity of errors reported by the task executed based on a non-update disk image. In some instances, the serverless code execution system 110 may be preconfigured with criteria for evaluating performance information to identify potential issues. In other instances, owners of a task (e.g., the user that created the task) may specify such criteria. Further, in some instances owners of a task may specify particular performance information to monitor when evaluating criteria, including information gained from environments 402 and potentially other information. For example, where a task execution is intended to write data to a network-accessible location (e.g., of auxiliary services 106) the owner may specify that the service 190 should evaluate the data at that location to determine whether a potential issue has occurred. Illustratively, a task may write a particular value to the location on successful execution, and the service 190 may determine a potential issue exists if that value does not exist at the location.

Thereafter, at (8), the service 190 modifies the version transition parameters for the task based on potential issues detected, if any. For example, the service 190 may halt or rollback a transition if a threshold number or proportional amount of potential issues are detected (e.g., if a threshold number or proportion of tasks executed with an updated image have potential issues detected). In some instances, the amount of change may be proportional to the severity. For example, the gradual transition may rapidly rollback when a large number or proportion of errors is detected, or less rapidly rollback when a smaller number of errors is detected. If no potential errors are detected, the service 190 can gradually increase the proportion of calls supported by an updated disk image (e.g., according to a pre-defined schedule), until the transition to the new version of the task is complete.

While the above examples are provided under the assumption that an updated disk image could cause errors, the converse is also possible: that an updated disk image reduces errors. In such an instance, the service 190 may increase a speed of transition to the new version of the disk image, such as by accelerating a pre-defined schedule to reach complete transition at a sooner point in time.

Note that the interactions of FIG. 4 may occur repeatedly, and potentially concurrently. Thus, modification of the version transition parameters may result in new metadata being obtained by the frontend 120 when implementing interaction (2) for a subsequent set of calls, which may result in a different proportion of calls being directed to environments 402 provisioned with an updated disk image, which may result in new performance information being generated and further modification of version transition parameters based on that information. Thus, the interactions of FIG. 4 provide for a gradual transition to supporting task executions with an updated disk image, while guarding against and rectifying errors or issues that might occur due to that updated disk image.

Figure 5:
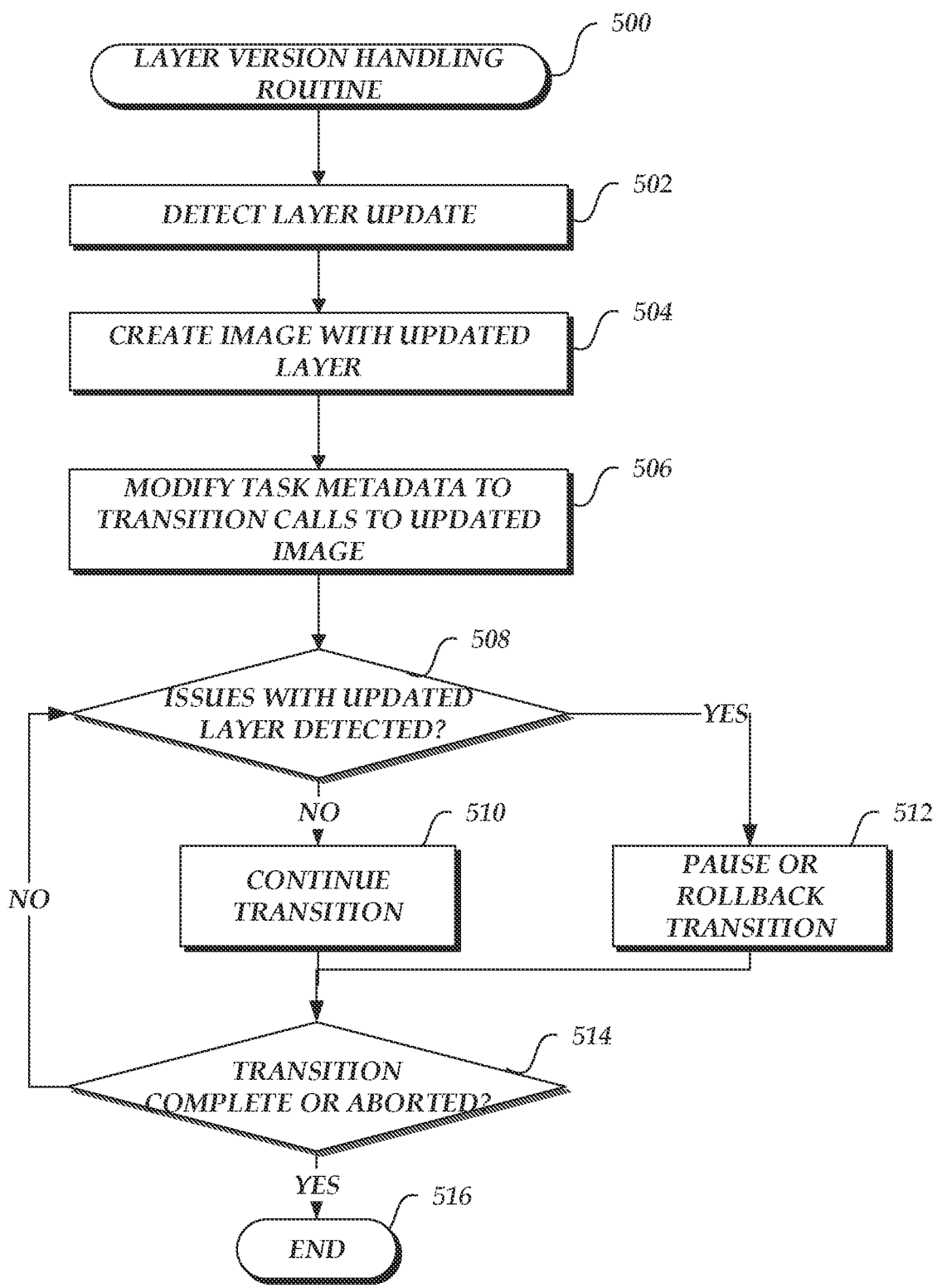
FIG. 5 is a flow chart depicting an illustrative routine for automatically updating a disk image while controlling for potential compatibility issues.

With reference to FIG. 5, an illustrative routine 500 for automatically updating a disk image while controlling for potential compatibility issues will be described. The routine 500 may be implemented, for example, by the image update service 190 of FIG. 1.

The routine 500 begins at block 502, where the service 190 detects an update to a layer reference in one or more disk images managed by the service 190. For example, the layer may contain a commonly used piece of software (e.g., an open source library, a runtime environment, a public data set, etc.), and a provider of that software may upload to a serverless compute service a new version of the software in the form of an updated layer.

At block 504, the service 190 creates an updated disk image including the updated layer. For example, the service 190 may identify a disk image managed by the service 190 that includes a prior version of the layer, such as by inspecting disk image manifests to detect reference to the prior version of the layer. The service 190 can create a new disk image by generating a new manifest that replaces the reference to the prior version with a reference to the updated layer. In some instances, the service 190 can further "flatten" the layers to a flattened disk image.

At block 506, the service 190 modifies task metadata for a task associated with the disk image, in order to transition calls to execute the task to executions supported by the updated disk image. For example, the service 190 may generate a new version of the task, and link that new version to the updated disk image, such that executions of the new version are provisioned with the updated disk image. The service 190 may further specify a proportion of task executions to correspond to the new version, such that as new calls to execute the task are received, that proportion results in execution of the new task version (with a remaining proportion resulting in execution of the existing task version).

At block 508, the service 190 monitors performance data for the task executions in order to detect whether potential issues exist with the updated disk image (e.g., with the updated layer in the updated disk image). As noted above, potential issues may be detected based on evaluation of performance metrics for task executions and/or errors and warnings occurring during the task executions. Additionally or alternatively, potential issues may be detected based on owner-specified data, such as the presence (or absence) of expected data at a network location. Criteria for evaluating performance data may be pre-defined by an administrator of the serverless compute system, defined by an owner of the task, or both. In some instances, the criteria may specify severities of the issue. For example, a first set of criteria may be used to detect a minor issue, while a second set of criteria may be used to detect a major issue.

The routine 500 then varies according to whether an issue is detected at block 508. If so, the routine 500 proceeds to block 512, where the transition is paused or rolled back, depending on the criteria satisfied. For example, minor issues may result in a pause of the transition, such that the proportion of calls supported by an updated disk image is held constant. Major issues may result in a rollback, such that the proportion is reduced. Alternatively, minor issues my result in a less severe rollback (e.g., a small reduction) while major issues may result in a severe rollback (a large reduction or reduction to zero).

In the instance that no issue is detected at block 508, the routine 500 continues to block 510, where the transition continues. For example, the service 190 may increase the proportion at pre-defined intervals such that the transition eventually completes with all calls resulting in execution supported by the updated disk image. While the routine 500 varies according to the present or absence of issues with an updated disk image, the routine 500 may in some instances be modified to account of detection of issues with a non-updated disk image. For example, if performance data improves for executions supported by an updated disk image, the transition may be sped up relative to a normal continued transition.

Thereafter, at block 514, the routine 500 varies according to whether the transition is completed or aborted (e.g., when the proportion reaches 100 or 0 percent, respectively). If so, the routine 500 ends at block 516. Otherwise, the routine 500 returns to block 508, where the service 190 continues to monitor performance data and adjust the gradual transition, as described above.

While FIG. 5 is described with respect to a single task and a single disk image, the routine 500 may be implemented with respect to a variety of tasks, potentially corresponding to multiple disk images. Moreover, the performance data gathered for one task may in some cases be used to manage gradual transitions of other tasks. For example, assume that multiple different tasks rely on disk images sharing a common layer. In the instance that an update to that layer causes performance issues with one of the disk images, it may also be likely that the update would cause performance issues with another of the disk images. This may be particularly true of the two disk images share other layers. For example, it may be that disk images commonly combine two layers, and that an update to one layer breaks compatibility with another layer. In this instance, errors detected with a first task using a disk image that combines the layers may also indicate that similar errors would be detected for a second task using a different disk image that combines the layers. Thus, data garnered from monitoring execution of the first task can be used to control gradual transition of the second task.

Illustratively, the service 190 may be configured to determine whether at least a threshold amount of other tasks with overlapping dependencies (e.g., overlapping layers in the respective disk images) experience errors when updating a given layer, and if so to assume that such errors would also occur with other tasks having those overlapping dependencies. This determination may occur for each combination of overlapping dependencies including the layer to be evaluated for updates. Thus, if 90% (as one example threshold) of all task executions relying on a disk image having an updated layer experience errors after that update, the service 190 may determine that any task having an image with the layer is likely to experience errors when updating the layer. Similarly, if 90% of all task executions relying on a disk image having the updated layer and at least one other specified layer experience errors after the update, the service 190 may determine that any task having an image with the layer and the other specified layer is likely to experience errors when updating the layer. Evaluating all possible combinations can enable the service 190 to detect incompatibilities between specific combinations of layers, which may be difficult or impossible to otherwise detect.

In one embodiment, the above-noted evaluations can be further refined with knowledge of the data accessed by a task execution prior to an error or performance issue occurring. As noted above, in some instances a service 190 may correlate block locations within a file system of a disk image with specific layers of that disk image, and thereby determine (based on block locations read during execution) what layers have been accessed by the execution. In such embodiments, the service 190 may associate a performance issue detected with a layer only when data of the layer has been read by the task execution. Such pruning of performance data may assist in avoiding false negatives, by preventing a performance issue from being attributed to a layer not actually accessed prior to an issue occurring. Thus, performance data from a first implementation of the routine 500 may be used to alter a second implementation of the routine 500. For example, block 508 may be modified to account for performance data of other implementations of the routine 500, or statistical measures of that data.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A serverless code execution system comprising:
   one or more data stores including i) information defining a first version of a serverless function, wherein the information identifies a layered disk image supporting execution of the first version of the serverless function, and ii) the layered disk image, wherein the layered disk image defines a file system, the layered disk image comprising a set of layers, each layer including a portion of data of the file system, wherein a first layer of the set of layers includes executable code corresponding to the first version of the serverless function and a second layer of the set of layers includes data depended on by the executable code;
   one or more first computing devices configured to respond to calls to invoke the serverless function by invoking the first version of the serverless function, wherein invoking the first version of the serverless function includes provisioning one or more first execution environments with access to the file system defined within the layered disk image and executing the executable code within the one or more first execution environments; and
   one or more second computing devices implementing an update service configured to:
      obtain a new layer corresponding to an updated version of the data within the second layer;
      generate an updated disk image corresponding to a modification of the layered disk image to replace the second layer with the new layer;
      generate a second version of the serverless function whose execution is supported by the updated disk image, wherein invoking the second version of the serverless function includes provisioning one or more second execution environments with access to a file system defined within the updated disk image and executing the executable code within the one or more second execution environments;
      modify the one or more first computing devices to respond to the calls to invoke the serverless function by causing a first portion of the calls to invoke the first version of the serverless function and a second portion of the calls to invoke the second version of the serverless function;
      monitor invocations of the second version of the serverless function to obtain performance data regarding the second version of the serverless function; and
      modifying a relative proportion of the first and second portions based on the performance data, wherein modifying the relative proportion includes increasing the relative proportion when the performance data indicates a lack of errors.

2. The serverless code execution system of claim 1, wherein the layered disk image is an Open Container Initiative (OCI) Image-Specification conforming image.

3. The serverless code execution system of claim 1, wherein the data depended on by the executable code is at least one of a library, a runtime, or a software utility.

4. The serverless code execution system of claim 1, wherein provisioning the one or more first execution environments with access to the file system defined within the layered disk image comprises generating a flattened disk image from the layered disk image and provisioning the one or more first execution environments with access to flattened disk image.

5. A computer-implemented method comprising:
   obtaining a new layer corresponding to an updated version of data within a first layer of a layered disk image, wherein the layered disk image defines a file system, wherein the first layer includes data depended on by executable code included within a second layer of the layered disk image, wherein the layered disk image supports execution of a first version of a serverless function on a serverless compute system;
   generating an updated disk image corresponding to a modification of the layered disk image to replace the first layer with the new layer;
   generating a second version of the serverless function whose execution is supported by the updated disk image;

modifying operation of the serverless compute system to respond to calls to invoke the serverless function by causing a first portion of the calls to invoke the first version of the serverless function and a second portion of the calls to invoke the second version of the serverless function, wherein invoking the first version of the serverless function includes provisioning one or more first execution environments with access to the file system defined within the layered disk image and executing the executable code within the one or more first execution environments, and wherein invoking the second version of the serverless function includes provisioning one or more second execution environments with access to a file system defined within the updated disk image and executing the executable code within the one or more second execution environments;

monitoring invocations of the second version of the serverless function to obtain performance data regarding the second version of the serverless function; and modifying a relative proportion of the first and second portions based on the performance data.

6. The computer-implemented method of claim 5, wherein modifying a relative proportion of the first and second portions based on the performance data comprises reducing the second portion relative to the first portion in response to detecting within the performance data at least one of errors or a reduction in performance metrics.

7. The computer-implemented method of claim 6, wherein the performance metrics relate to at least one of a time to complete invocation of the second version of the serverless function or computing resources used during invocation of the second version of the serverless function.

8. The computer-implemented method of claim 5 further comprising monitoring invocations of the first version of the serverless function to obtain performance data regarding the first version of the serverless function, wherein the relative proportion is further modified based on the performance data regarding the first version of the serverless function.

9. The computer-implemented method of claim 5 further comprising monitoring invocations of other serverless function associated with the new layer to obtain performance data regarding the other serverless functions, wherein the relative proportion is further modified based on the performance data regarding the other serverless functions.

10. The computer-implemented method of claim 9, wherein modifying the relative proportion of the first and second portions based on the performance data regarding the other serverless functions comprises determining that a threshold number of invocations of the other serverless functions have resulted in errors and in response reducing the relative proportion of the second portion to the first portion.

11. The computer-implemented method of claim 10, wherein determining that the threshold number of invocations of the other serverless functions have resulted in errors comprises determining that the threshold number of invocations of the other serverless functions have resulted in errors subsequent to reading data included within the new layer.

12. The computer-implemented method of claim 9, wherein the other serverless functions are associated with the new layer and at least one additional layer also included within the updated disk image.

13. One or more non-transitory computer-readable media comprising computer-executable instructions that, when executed on a serverless compute system, cause the serverless compute system to:

obtain a new layer corresponding to an updated version of data within a first layer of a layered disk image, wherein the layered disk image defines a file system, wherein the layered disk image comprises the first layer and a second layer, the second layer including code executable to implement a serverless function, and where the layered disk image is associated with a first version of the serverless function on the serverless compute system;

generate an updated disk image corresponding to a modification of the layered disk image to replace the first layer with the new layer;

generate a second version of the serverless function associated with the updated disk image;

modify operation of the serverless compute system to respond to calls to invoke the serverless function by causing a first portion of the calls to invoke the first version of the serverless function and a second portion of the calls to invoke the second version of the serverless function, wherein invoking the first version of the serverless function includes provisioning one or more first execution environments with access to the file system defined within the layered disk image and executing the executable code within the one or more first execution environments, and wherein invoking the second version of the serverless function includes provisioning one or more second execution environments with access to a file system defined within the updated disk image and executing the executable code within the one or more second execution environments;

monitor invocations of the second version of the serverless function to obtain performance data regarding the second version of the serverless function; and modify a relative proportion of the first and second portions based on the performance data.

14. The one or more non-transitory computer-readable media of claim 13, wherein the computer-executable instructions further cause the serverless compute system to monitor invocations of the first version of the serverless function to obtain performance data regarding the first version of the serverless function, wherein the relative proportion is further modified based on the performance data regarding the first version of the serverless function.

15. The one or more non-transitory computer-readable media of claim 14, wherein the relative proportion is modified to increase the second portion relative to the first portion responsive to determining that the performance data regarding the first version of the serverless function indicates lower performance than the performance data regarding the second version of the serverless function.

16. The one or more non-transitory computer-readable media of claim 14, wherein the layered disk image is defined at least in part by a manifest specifying the first layer and the second layer, and wherein to generate the second version of the serverless function associated with the updated disk image, the computer-executable instructions cause the serverless compute system to generate a second manifest specifying the new layer and the second layer.

17. The one or more non-transitory computer-readable media of claim 14, wherein the computer-executable instructions further cause the serverless compute system to verify that the new layer corresponds to the updated version of data within the first layer by verifying that a digital fingerprint of the first layer matches a digital fingerprint associated with a prior version of data contained the new layer.

18. The one or more non-transitory computer-readable media of claim 14, wherein to modify the relative proportion of the first and second portions based on the performance data, the computer-executable instructions further cause the serverless compute system to evaluate the performance data based on criteria defined by an end user associated with the serverless function.

19. The one or more non-transitory computer-readable media of claim 14, the computer-executable instructions further cause the serverless compute system to monitor invocations of other serverless function associated with the new layer to obtain performance data regarding the other serverless functions, wherein the relative proportion is further modified based on the performance data regarding the other serverless functions.

20. The one or more non-transitory computer-readable media of claim 19, wherein to modify the relative proportion of the first and second portions based on the performance data regarding the other serverless functions, the computer-executable instructions cause the serverless compute system to determine that a threshold number of invocations of the other serverless functions have resulted in errors and in response to reduce the relative proportion of the second portion to the first portion.

\* \* \* \* \*

UNITED STATES PATENT AND TRADEMARK OFFICE
CERTIFICATE OF CORRECTION

PATENT NO. : 11,900,152 B1
APPLICATION NO. : 17/218015
DATED : February 13, 2024
INVENTOR(S) : Marc Brooker et al.

It is certified that error appears in the above-identified patent and that said Letters Patent is hereby corrected as shown below:

In the Claims

In Column 23, Claim 9, Lines 40-41, delete "function" and insert --functions--.

In Column 25, Claim 19, Line 11, delete "function" and insert --functions--.

Signed and Sealed this
Fourteenth Day of May, 2024

Katherine Kelly Vidal
*Director of the United States Patent and Trademark Office*